United States Patent [19]
Martin

[11] 3,951,297
[45] Apr. 20, 1976

[54] ANTI-SIPHON GAS TANK ADAPTOR

[75] Inventor: Ronald J. Martin, Fountain Valley, Calif.

[73] Assignees: Carlos A. Riquelme; Paul Keele, both of Fullerton, Calif. ; part interest to each

[22] Filed: May 6, 1974

[21] Appl. No.: 466,988

[52] U.S. Cl. .................................... 220/86 AT
[51] Int. Cl.² ........................................ B67C 3/00
[58] Field of Search ............................ 220/86 AT

[56] References Cited
UNITED STATES PATENTS

| | | | |
|---|---|---|---|
| 1,512,065 | 10/1924 | Taylor | 220/86 AT |
| 1,766,916 | 6/1930 | MacLiver | 220/86 R |
| 1,813,554 | 7/1931 | Wickline | 220/86 AT |
| 1,895,251 | 1/1933 | Karl | 220/86 AT |
| 1,976,975 | 10/1934 | Williams | 220/86 R |
| 1,995,007 | 3/1935 | Myers | 220/86 AT |
| 2,050,793 | 8/1936 | Hille | 220/86 AT |
| 2,052,782 | 9/1936 | Mann | 220/86 R |
| 2,313,266 | 3/1943 | Roberts | 220/86 AT |
| 3,552,435 | 1/1971 | Andersson | 220/85 F |

Primary Examiner—George E. Lowrance
Assistant Examiner—Allen N. Shoap
Attorney, Agent, or Firm—Harvey C. Nienow

[57] ABSTRACT

An anti-siphon fluid tank adaptor to prevent the insertion of a siphoning tube while nonetheless permitting rapid filling of the tank.

The adaptor comprises an extension firmly secured to the tank and a tubular sleeve firmly welded to the extension and having an end portion within the tank covered with a conically-shaped member. The sleeve is provided with several holes about the circumference of the sleeve and one end of the extension is provided with means for receiving a cap for closing the entire adaptor.

1 Claim, 4 Drawing Figures

U.S. Patent  April 20, 1976  3,951,297
FIG. 1
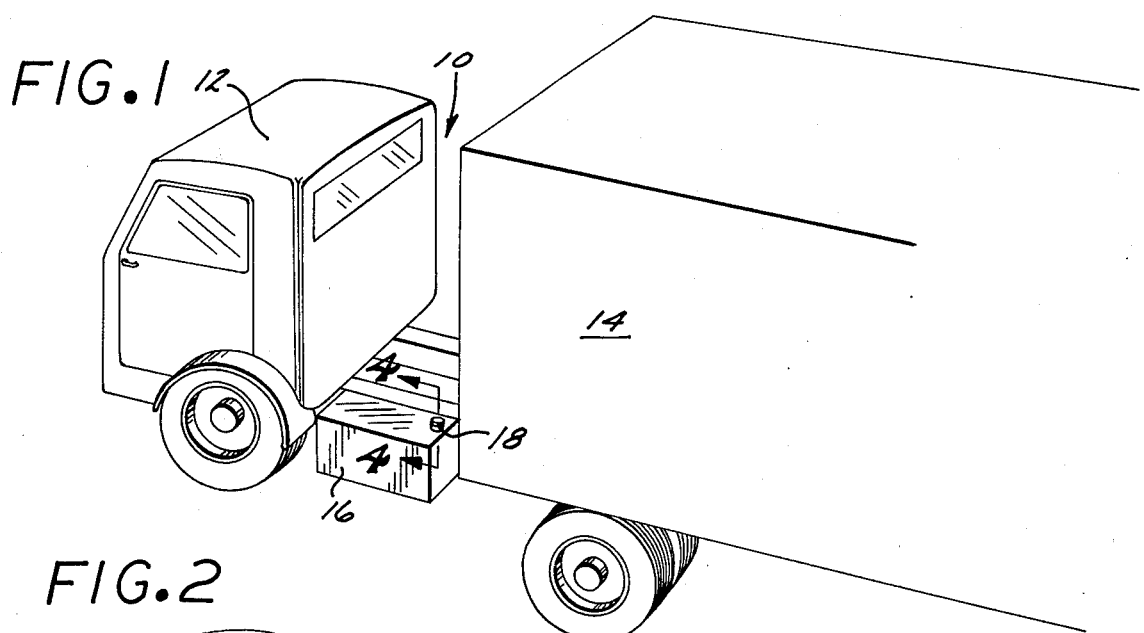
FIG. 2
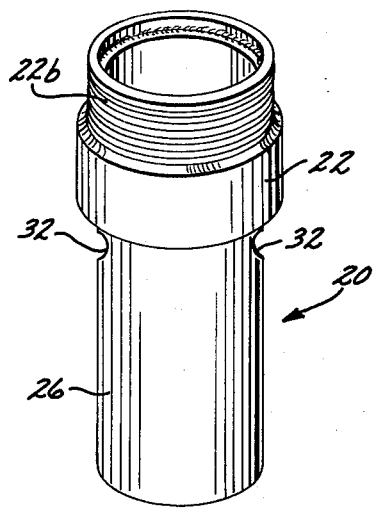
FIG. 3
FIG. 4
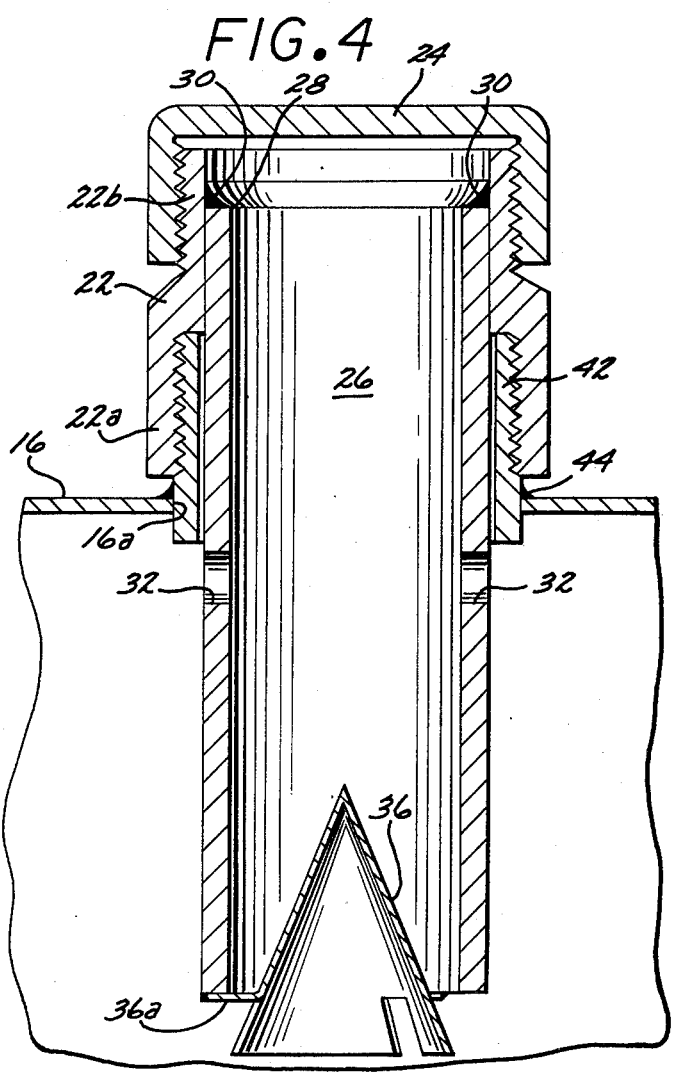

ANTI-SIPHON GAS TANK ADAPTOR

The present invention relates generally to anti-siphon fluid tank adaptors, and more particularly to such anti-siphon adaptors which permit of rapid and efficient filling of the tank.

Relatively large truck gasoline or diesel fuel tanks, as well as other fluid tanks, are subject to being siphoned due to the fact that they are easily accessible and are available to many passersby. As such, it is not uncommon to discover that all of the gasoline or diesel fuel has been removed from a truck tank when the vehicle has been parked for a period of time. This is particularly true when such fuel is relatively scarce or expensive.

It has been desirable to provide some sort of anti-siphon means within the intake opening of such fluid tanks, but all prior devices have generally impeded the ingress of fluid to the tank such that the filling operation required a great deal of time or spillage of considerable quantity was experienced. Either situation is undesirable.

In view of the foregoing, it is an object of the present invention to provide an anti-siphon fluid tank adaptor which enables the tank to be filled rapidly and which nonetheless prevents siphoning of such tank.

Another object of the present invention is to provide an anti-siphon fluid tank adaptor as characterized above which is substantially immune to breakage and deterioration.

A further object of the present invention is to provide an anti-siphon fluid tank adaptor as characterized above which will permit siphoning of the fluid within the tank only if the tank is ruptured and thus destroyed.

A further object of the present invention is to provide an anti-siphon fluid tank adaptor as characterized above which is simple and inexpensive to manufacture and which is rugged and dependable in operation.

The novel features which I consider characteristic of my invention are set forth with particularity in the appended claims.

The device itself, however, both as to its organization and mode of operation, together with additional objects and advantages thereof, will best be understood from the following description of specific embodiments when read in connection with the accompnaying drawings, in which:

FIG. 1 is a fragmentary perspective view of a truck showing a gasoline tank provided with the subject adaptor;

FIG. 2 is a perspective view of the adaptor;

FIG. 3 is a bottom plan view of the adaptor of FIG. 2 and;

FIG. 4 is a fragmentary sectional view through the adaptor of FIG. 1, taken substantially along line 4—4 thereof.

Like reference characters indicate corresponding parts throughout the several views of the drawings.

Referring to FIG. 1 of the drawings, there is shown therein a truck 10 having a tractor 12 and a trailer 14. As is typical in such equipment, a relatively large fuel tank 16 is firmly secured to the tractor 12 and comprises a filling spout 18.

Since such trucks, of necessity, carry an unusually large amount of fuel, they are very subject to having the fuel stolen by siphoning wherein a siphoning tube is placed into the tank through the filling spout.

To prevent this, the adaptor 20 shown in FIG. 2 of the drawings is secured within such filling spout. It comprises an extension 22 which, as shown most clearly in FIG. 4 of the drawings, is formed with an internally threaded lower end portion 22a and an externally threaded upper end portion 22b. To enable the cover or cap 24 to be used after the adaptor 20 has been suitably placed on the tank 16, as will hereinafter be explained, the threads on the end portion 22a and 22b should be complemental of each other.

A tubular sleeve 26 is formed of suitably strong material such as steel, is telescopically positioned within the extension 22 to a point slightly beneath the upper end of end portion 22b as shown at 28 in FIG. 4. While so positioned, the sleeve 26 is firmly secured to the internal surface of end portion 22b of extension 22 by a continuous weld as shown at 30. Thus, the sleeve and extension become a unitary structure, virtually incapable of being separated without the use of a cutting torch or the like.

Sleeve 26 is provided with several holes 32 which, as shown most clearly in FIG. 2 of the drawings, are formed near the mid-point of the length of such sleeve. The holes 32, may be formed in the sleeve during its initial manufacture, or they may be provided by a drilling operation thereafter. However, they should be sufficient in number to faciitate flow of air from the tank 16 as will hereinafter be explained.

Positioned in the lower open end of sleeve 26 is a conically-shaped member 36. Such member is formed of sheet material and at least three welding tabs 36a are provided. These tabs may be cut or punched from the material of which member 36 is formed or they may be made separately and welded to conical member 36.

The tabs 36a are welded, as shown in FIGS. 3 and 4 of the drawings, to the end of sleeve 26. Thus, the member 36 extends upwardly into the lower end of sleeve 26, preventing insertion of objects into tank 16, as for instance siphoning tubes or hoses and the like. Nonetheless, fuel or the like entering tank 16 will flow freely around member 26 at a fast rate.

The adaptor 20 is quickly and easily applied to an existing intake spout of a tank such as fuel tank 16. Typically, such tank is formed with an opening 16a in the side wall thereof and a filling spout 42 is securely welded thereto as shown at 44. This is part of the construction of the tank as originally supplied.

Thereafter, when it is desired to affix the adaptor 20 thereto, it is merely necessary to remove the cap 24 from the spout 42 and thread the extension 22 thereon. By using epoxy bonding material or by welding, if such is desired, the extension 22 can be firmly and irretrievably secured to the spout 42. This, of course, places the sleeve 26 within the extension 22, partially within the tank 16 as shown in FIG. 4. The cap 24 is then threadedly secured to the upper end 22b of extension 22.

Any siphoning attempts are completely thwarted by virtue of the fact that a siphoning tube or hose cannot be inserted into tank 16 through the adaptor. That is, any tube inserted through sleeve 26 is prevented from passing into the tank proper by virtue of the member 36.

With the various parts of adaptor 20 made of steel of sufficient strength and thickness, the entire tank and adaptor must be destroyed before someone can effectively siphon the contents of tank 16.

It is thus seen that the present invention provides an adaptor for tanks such as fuel tanks and the like which can be added to existing intake spouts and which will effectively prevent siphoning from the tank while nonetheless permitting fast and efficient filling thereof.

Although I have shown and described certain specific embodiments of my invention, I am well aware that many modifications thereof are possible.

I claim:

1. An anti-siphon intake adaptor for truck fuel tanks comprising in combination, a tubular extension adapted to be firmly affixed to a truck fuel tank about an opening in the wall of the latter, a tubular sleeve telescopically positioned within said extension and rigidly secured thereto, said sleeve having a plurality of radial openings formed in the side wall thereof, a generally conically-shaped end member having an imperforate side wall whose cross section at the base of said cone approximates the internal cross section of said sleeve, said end member further comprising tabs punched therefrom at the marginal edge of said base and extending outwardly from the end member, said tabs being welded to the end of said sleeve to position said end member with the apex of the conical configuration within said sleeve and the base thereof outside of said sleeve, the base of said end member and said outwardly extending tabs preventing access longitudinally of said sleeve into said fuel tank, and means formed on one end of said extension to receive a cap for closing the end of said adaptor.

* * * * *